(12) United States Patent
Lin et al.

(10) Patent No.: US 6,989,701 B2
(45) Date of Patent: Jan. 24, 2006

(54) PULSE WIDTH MODULATION DRIVING APPARATUS FOR LIGHT EMITTING DIODE

(75) Inventors: Jyh Chain Lin, Tu-chen (TW); Ching Yen Lee, Tu-chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 9 days.

(21) Appl. No.: 10/750,121

(22) Filed: Dec. 31, 2003

(65) Prior Publication Data

US 2004/0155600 A1 Aug. 12, 2004

(30) Foreign Application Priority Data

Dec. 31, 2002 (TW) ............................... 91137949 A

(51) Int. Cl.
*H03K 3/017* (2006.01)

(52) U.S. Cl. ........................ 327/175; 327/109; 327/515

(58) Field of Classification Search ........ 327/172–176, 327/50–52, 56, 63, 68, 90, 164, 514, 515, 327/108, 109; 372/38.02; 345/39
See application file for complete search history.

(56) References Cited

U.S. PATENT DOCUMENTS

| 4,514,727 A | * | 4/1985 | Van Antwerp | ............... 345/691 |
| 5,317,307 A | | 5/1994 | Thomas, Jr. | |
| 5,604,759 A | * | 2/1997 | Miyaki et al. | ........... 372/38.02 |
| 5,856,812 A | * | 1/1999 | Hush et al. | ................. 345/74.1 |
| 6,194,936 B1 | * | 2/2001 | Yama | .......................... 327/175 |
| 6,320,330 B1 | * | 11/2001 | Haavisto et al. | ............ 315/291 |
| 6,362,578 B1 | | 3/2002 | Swanson et al. | |
| 6,369,554 B1 | * | 4/2002 | Aram | .......................... 323/282 |
| 6,469,564 B1 | * | 10/2002 | Jansen | ........................ 327/365 |
| 6,504,334 B2 | | 1/2003 | Sogawa | |
| 6,580,735 B1 | * | 6/2003 | Theodoras, II | ........... 372/38.02 |
| 6,586,890 B2 | | 7/2003 | Min et al. | |
| 6,596,977 B2 | | 7/2003 | Muthu et al. | |
| 6,609,842 B1 | * | 8/2003 | Kimbrough | ................. 398/195 |
| 6,621,235 B2 | | 9/2003 | Chang | |
| 6,674,269 B1 | * | 1/2004 | McIntyre | ..................... 323/266 |
| 6,680,834 B2 | * | 1/2004 | Williams | ...................... 361/58 |
| 6,744,987 B1 | * | 6/2004 | Boytim et al. | ................. 398/98 |

* cited by examiner

*Primary Examiner*—Tuan T. Lam
*Assistant Examiner*—Hai L. Nguyen
(74) *Attorney, Agent, or Firm*—Wei Te Chung

(57) ABSTRACT

A PWM driving apparatus for an LED includes a sawtooth wave generator (1) for generating a sawtooth wave signal, a comparator (2), an FET (3), a first resistor (4), a second resistor (5), a power supply (7), and a light emitting diode array (8). A modulation signal provided by a modulation signal source (6) and the sawtooth wave signal are fed to the comparator, an output of the comparator is connected to a gate terminal of the FET, the power supply is connected to a source terminal of the FET through the first resistor, and a drain tenninal of the FET outputs a driving current through the second resistor to the light emitting diode array.

8 Claims, 3 Drawing Sheets

PULSE WIDTH MODULATION DRIVING APPARATUS FOR LIGHT EMITTING DIODE

BACKGROUND OF THE INVENTION

1. Field of the Invention

The present invention relates to a driving apparatus for light emitting diodes (LEDs), and more particularly to a pulse width modulation (PWM) driving apparatus for an LED.

2. Description of the Prior Art

FIG. 4 illustrates a conventional LED driving apparatus. The LED driving apparatus includes a power supply 10, a current limiting resistor 20 and an LED array 30 connected in series. The LED array 30 comprises a plurality of LEDs 31 arranged in an n×m matrix. In use, a forward current passing through each LED 31 determines its light output; therefore the light output of each LED 31 can be controlled by adjusting the forward current passing therethrough.

Referring to FIG. 5, a typical volt-ampere characteristic of a single LED 31 can be represented by the following equation:

$$V_F = V_{on} + R_s I_f + (\Delta V/\Delta T)(T - 25° C.) \qquad (1),$$

In this equation, $V_F$ and $I_f$ represent a voltage applied to the LED 31 and a current flowing through the LED 31 respectively. $V_{on}$ is a threshold voltage of the LED 31, $R_s$ represents equivalent resistance of the LED 31, $(\Delta V/\Delta T)$ represents a temperature coefficient, and T represents junction temperature. A typical value of the temperature coefficient is 2V/° C. At a certain temperature, equation (1) can be simplified as:

$$V_F = V_{on} + R_s I_f \qquad (2), \text{ and}$$

therefore a volt-ampere characteristic of the LED driving apparatus can be written as:

$$U - m V_{on} = I[R + (m/n) R_s] \qquad (3), \text{ in which}$$

U is a voltage of the power supply 10, and I is a driving current for the LED array 30. Equation (3) can be simplified as:

$$U - V_x = I(R + R_x) \ldots (4), \text{ and } V_x = m V_{on}, R_x = (m/n) R_s \qquad (4)$$

Equation (4) shows that the driving current I of the LED array 30 is not proportional to the voltage U of the power supply 10 due to the existence of the threshold voltage $V_{on}$ of each LED 31. That is, the driving current I of the LED array 30 does not change linearly when the voltage U of the power supply 10 changes linearly. Therefore it is difficult to precisely control the light output of the LED array 30.

Furthermore, when the number of LEDs 31 in the LED array 30 changes, both $V_x$ and $R_x$ are changed. Accordingly, either the voltage U of the power supply 10 or the resistance R of the current limiting resistor 20 must be changed in order to adjust the driving current I of the LED array 30. As described above, it is difficult to precisely control the driving current I (and thus the light output) by adjusting the voltage of the power supply, due to the nonlinear relationship between the driving current I of the LED array 30 and the voltage U of the power supply.

SUMMARY OF THE INVENTION

An object of the present invention is to provide a PWM driving apparatus for precisely controlling a light output of an LED array.

Another object of the present invention is to provide a PWM driving apparatus for an LED, the PWM driving apparatus being suitable for driving a variable load.

To achieve the above objects, the present invention provides a PWM driving apparatus for an LED. Said PWM driving apparatus is hereinafter referred to as an LED driving apparatus. The LED driving apparatus comprises a power supply, a current limiting resistor, a field effect transistor (FET), a sawtooth wave generator for generating a sawtooth wave signal, a comparator and at least one LED connected in series. A modulation signal source for providing a modulation signal and the sawtooth wave generator are connected to a positive and a negative input terminal of the comparator respectively. An output of the comparator connects to a gate terminal of the FET. The sawtooth wave signal and the modulation signal are compared in the comparator, and the output of the comparator determines an ON or OFF status of the FET.

Other objects, advantages, and novel features of the present invention will become more apparent from the following detailed description when taken in conjunction with the accompanying drawings; in which:

DETAILED DESCRIPTION OF THE INVENTION

Figure 1:
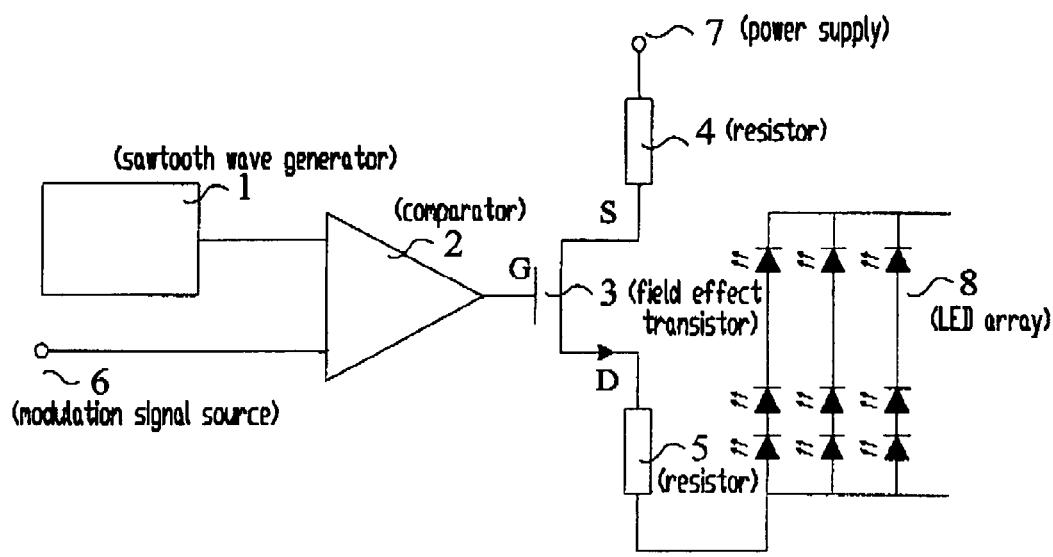
FIG. 1 schematically shows an LED driving apparatus of the present invention.

Referring to FIG. 1, a PWM driving apparatus of the present invention is for driving an LED. Hereinafter, said PWM driving apparatus will be referred to as an LED driving apparatus. The LED driving apparatus includes a sawtooth wave generator 1 for generating a sawtooth wave signal, a comparator 2, an FET 3, a first current limiting resistor 4, a second current limiting resistor 5, a power supply 7, and an LED array 8 used as a load.

The sawtooth wave generator 1 generates and outputs a sawtooth wave signal. The output of the sawtooth wave generator 1 is connected to a positive input terminal (not labeled) of the comparator 2. A modulation signal source 6 is connected to a negative input terminal (not labeled) of the comparator 2. An output of the comparator 2 is connected to a gate terminal G of the FET 3. The first current limiting resistor 4 is connected between the power supply 7 and a source terminal S of the FET 3, and a drain terminal D of the FET 3 outputs a driving current to the load (i.e., the LED array 8) through the second current limiting resistor 5. Furthermore, the FET 3 can be an N-channel enhancement-type FET, a P-channel enhancement-type FET, an N-channel depletion-type FET, a P-channel depletion-type FET, or any other suitable type of switching element.

Figure 2:
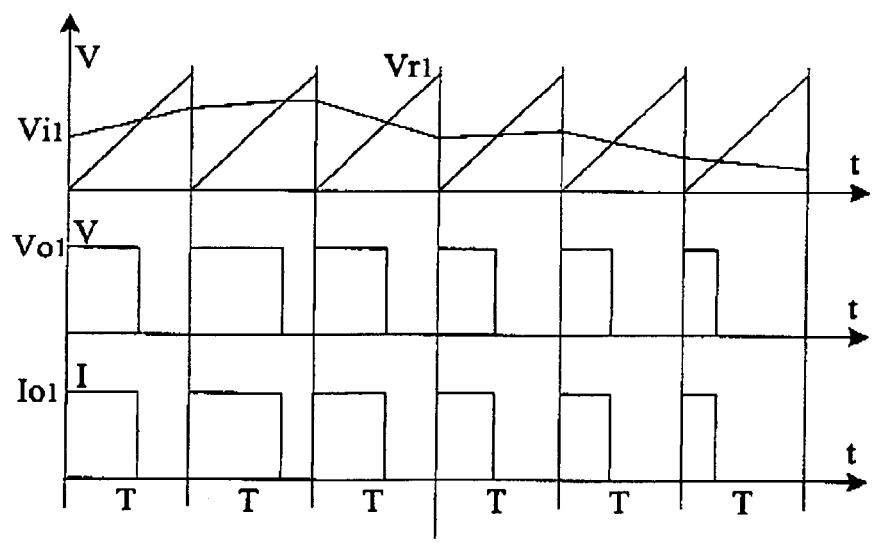
FIG. 2 illustrates waveforms of the LED driving apparatus of FIG. 1.

Referring to FIG. 2, $V_{i1}$ is a modulation signal provided by the modulation signal source 6, $V_{T1}$ is the sawtooth wave signal, and $V_{o1}$ is the voltage between the gate terminal G and the drain terminal D of the FET 3. That is, $V_{o1}$ is a gate driving voltage of the FET 3. $I_{o1}$ is a drain current of the FET 3, i.e. the driving current of the LED array 8. T is a cycle of the sawtooth wave signal $V_{r1}$. In use, the modulation signal $V_{i1}$ is compared with the sawtooth wave signal $V_{r1}$ in the comparator 2. The comparator 2 outputs a positive high level signal when the modulation signal $V_{i1}$, is lower than the sawtooth wave signal $V_{r1}$, and outputs a zero level signal when the modulation signal $V_{i1}$, is equal to or higher than the sawtooth wave signal $V_{r1}$. The FET 3 is turned on when the comparator 2 outputs a positive high level, and is turned off when the comparator 2 outputs a zero level signal. When the FET 3 is turned on, the power supply 7, the first current limiting resistor 4, the FET 3, the second current limiting resistor 5 and the LED array 8 cooperatively form a closed series loop. The closed series loop has a driving current passing through the LED array 8, in order to drive the LED array 8. When the FET 3 is turned off, the closed series loop is cut off and there is no driving current flowing to the LED array 8.

Figure 3:
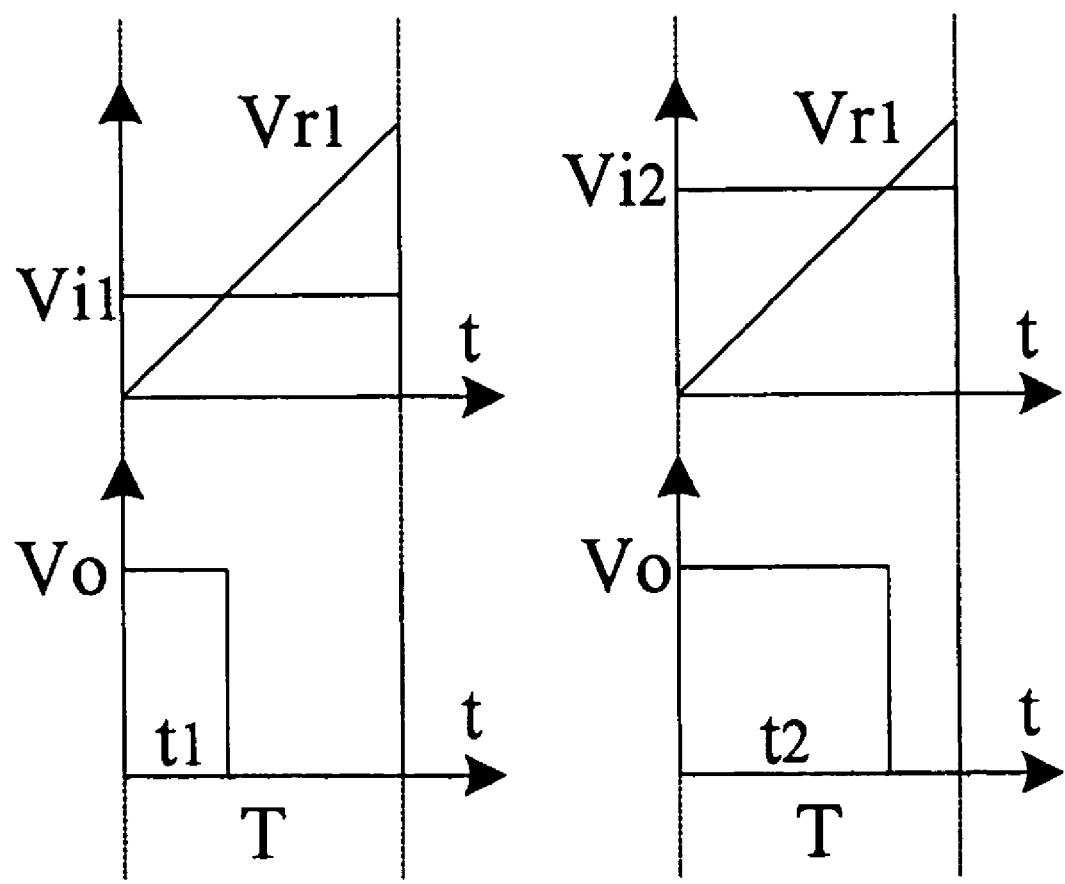
FIG. 3 illustrates waveforms of a comparator of the LED driving apparatus of FIG. 1.
Figure 4:
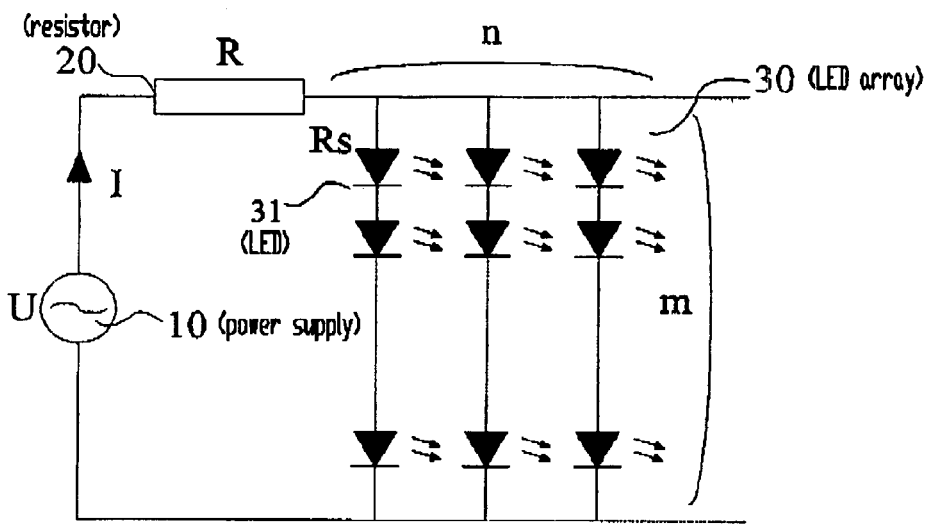
FIG. 4 schematically shows a conventional LED driving apparatus.
Figure 5:
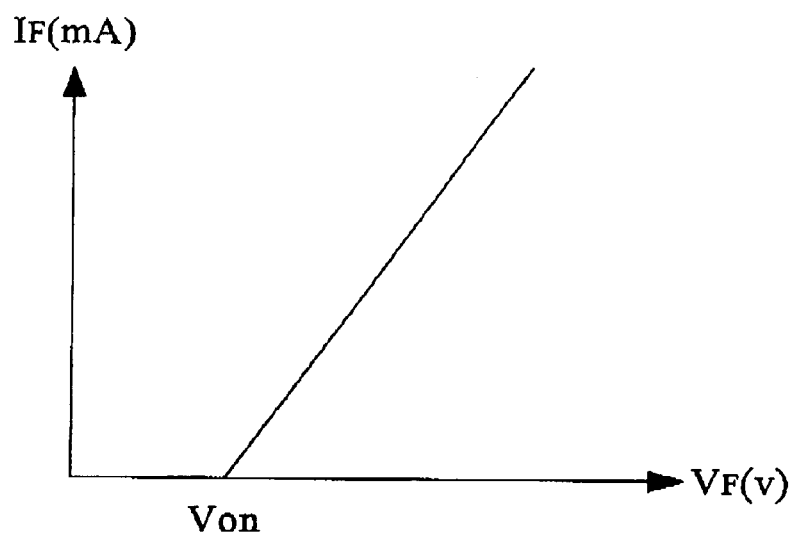
FIG. 5 illustrates a typical volt-ampere characteristic of a single LED of the LED driving apparatus of FIG. 4.

FIG. 3 shows output waveforms of the comparator 2 when different modulation signals are generated. $V_{i2}$ is another modulation signal different from the modulation signal $V_{i1}$. $V_o$ is the output of the comparator 2, $t_1$ is an interval in which the modulation signal $V_{i1}$ is higher than the sawtooth wave signal $V_{r1}$, and $t_2$ is an interval in which the modulation signal $V_{i2}$ is higher than the sawtooth signal $V_{r1}$. $t_1$ and $t_2$ are of course not equal, and have the following relationship: if $V_{i2}=K* V_{i1}$, then $t_2=K* t_1$, which means a duty cycle of the output $V_o$ of the comparator 2 is proportional to an amplitude of the modulation signal $V_{i1}$, $V_{i2}$. The output $V_o$ of the comparator 2 is connected to the gate terminal G of the FET 3. The FET 3 is turned on if the comparator 2 outputs a high level signal, and the LED driving apparatus outputs a certain driving current. The FET 3 is turned off if the comparator 2 outputs a zero level signal, and there is no driving current. Therefore, an equivalent driving current, (i.e. an average value of output current) is proportional to the duty cycle of the output $V_o$ of the comparator 2, and the duty cycle of the output $V_o$ of the comparator 2 is proportional to the modulation signal $V_{i1}$, $V_{i2}$. Therefore the equivalent driving current is proportional to the amplitude of the modulation signal $V_{i1}$, $V_{i2}$. in other words, linear changes of the modulation signal $V_{i1}$, $V_{i2}$ cause the driving current $I_{o1}$ (shown in FIG. 2) to change linearly. Accordingly, the driving current $I_{o1}$ can be precisely controlled according to need by adjusting the modulation signal $V_{i1}$, $V_{i2}$.

In the above-described conditions, an amplitude of the modulation signal $V_{i1}$, $V_{i2}$ is lower than a maximum value of the sawtooth wave signal $V_{r1}$ but higher than a minimum value thereof. However, in cases where the amplitude of the modulation signal $V_{i1}$, $V_{i2}$ is out of the range between the maximum value and the minimum value of the sawtooth wave signal $V_{r1}$, either of two operating modes can be adopted according to particular application requirements. First, the LED driving apparatus can either continue comparing the modulation signal $V_{i1}$, $V_{i2}$ and the sawtooth wave signal $V_{r1}$ in the comparator 2. Second, the LED driving apparatus can cooperate with an auxiliary circuit to obtain a desired function.

The LED driving apparatus of the present invention can be used as a light source for computer monitors, vehicle electronic displays, watercraft electronic displays and aircraft electronic displays, and in other kinds of display apparatus.

Advantages of the LED driving apparatus of the present invention over the prior art include the following. The LED driving apparatus can precisely control a light output from the LED array 8 because of its capability of linear adjustment of the driving current. Furthermore, the LED driving apparatus is adapted to drive an LED array which has a variable number of LEDs, by changing its modulation signal.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A pulse width modulation driving apparatus for a light emitting diode, comprising:
   a sawtooth wave generator for generating a sawtooth wave signal;
   a comparator;
   a field effect transistor having a gate terminal, a source terminal, and a drain terminal;
   a power supply;
   a first current limiting resistor and a second current limiting resistor; and
   at least one light emitting diode serving as a load;
   wherein a modulation signal and the sawtooth wave signal are input to the comparator, an output of the comparator is connected to the gate terminal of the field effect transistor, the first resistor is connected between the power supply and the source terminal of the field effect transistor, and the drain terminal of the field effect transistor outputs a driving current through the second resistor to the load.

2. The pulse width modulation driving apparatus as described in claim 1, wherein the field effect transistor is an N-channel enhancement-type field effect transistor.

3. The pulse width modulation driving apparatus as described in claim 1, wherein the field effect transistor is a P-channel enhancement-type field effect transistor.

4. The pulse width modulation driving apparatus as described in claim 1, wherein the field effect transistor is an N-channel depletion-type field effect transistor.

5. The pulse width modulation driving apparatus as described in claim 1, wherein the field effect transistor is a P-channel depletion-type field effect transistor.

6. A pulse width modulation driving apparatus assembly, comprising:
   a field effect transistor defining a gate terminal, a source terminal, and a drain terminal;
   a power supply and a first current limiting resistor connected to the source terminal;
   a light emitting diode array and a second current limiting resistor electrically connected to the drain terminal;
   a comparator connected to the gate terminal; and
   a modulation signal source and a wave generator respectively connected to input terminals of the comparator;
   wherein an equivalent driving current is provided on the drain terminal, which is proportional to an amplitude of a signal derived from the modulation signal source.

7. A method of providing a light emitting diode array with a linearly adjusted driving current, comprising steps of:
   providing a field effect transistor defining a gate terminal, a source terminal and a drain terminal;
   electrically connecting a light emitting diode array and a current limiting resistor to the drain terminal;
   electrically connecting a comparator to the gate terminal; and electrically connecting a modulation signal source and a wave generator to input terminals of the comparator, respectively;

electrically connecting a power supply and another current limiting resistor to the source terminal; and comparing the signals respectively from the modulation signal source and the wave generator in the comparator, and outputting a positive high level signal so as to turn on the field effect transistor;

wherein providing a driving current provided on the drain terminal for activating said light emitting diode array is changed linearly corresponding to a linear change of signals generated from the modulation signal source.

8. The method as described in claim 7, wherein the comparing step further comprises the steps of: outputting a positive high level signal when a modulation signal is lower than a wave signal generated by the wave generator, and outputting a zero level signal when a modulation signal is equal to or higher than a wave signal generated by the wave generator.

* * * * *